United States Patent
Scholte-Wassink et al.

(10) Patent No.: US 8,018,082 B2
(45) Date of Patent: Sep. 13, 2011

(54) METHOD AND APPARATUS FOR CONTROLLING A WIND TURBINE

(75) Inventors: Hartmut Scholte-Wassink, Lage (DE); Andreas Kirchner, Osnabrueck (DE); Enno Ubben, Steinfurt (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/625,853

(22) Filed: Nov. 25, 2009

(65) Prior Publication Data

US 2010/0140939 A1  Jun. 10, 2010

(51) Int. Cl.
*F03D 9/00* (2006.01)
*H02P 9/04* (2006.01)

(52) U.S. Cl. ......................................................... 290/44

(58) Field of Classification Search .................... 290/44, 290/55, 36 R, 7; 415/2.1, 4.1, 7; 322/7, 322/44; 416/1, 7
See application file for complete search history.

(56) References Cited

U.S. PATENT DOCUMENTS

| | | | | |
|---|---|---|---|---|
| 2,360,792 | A | * | 10/1944 | Putnam .......................... 290/4 R |
| 5,729,118 | A | * | 3/1998 | Yanagisawa et al. ........... 322/29 |
| 5,942,875 | A | | 8/1999 | Rosner |
| 6,891,281 | B2 | | 5/2005 | Wobben |
| 7,102,247 | B2 | | 9/2006 | Feddersen |
| 7,253,537 | B2 | | 8/2007 | Weng et al. |
| 7,372,173 | B2 | * | 5/2008 | Lutze et al. ..................... 290/44 |
| 7,423,406 | B2 | | 9/2008 | Geniusz |
| 7,518,256 | B2 | | 4/2009 | Saragueta et al. |
| 2003/0218338 | A1 | * | 11/2003 | O'Sullivan et al. ............. 290/43 |
| 2007/0267872 | A1 | * | 11/2007 | Menke ............................. 290/44 |
| 2008/0197636 | A1 | * | 8/2008 | Tilscher et al. ................. 290/54 |
| 2008/0303489 | A1 | | 12/2008 | Park et al. |
| 2009/0206607 | A1 | * | 8/2009 | Nakamura et al. .............. 290/44 |
| 2009/0273187 | A1 | * | 11/2009 | Gertmar et al. ................. 290/44 |
| 2009/0304506 | A1 | * | 12/2009 | Hehenberger ................... 416/1 |

* cited by examiner

*Primary Examiner* — Julio Gonzalez
(74) *Attorney, Agent, or Firm* — James McGuiness, Esq.; Armstrong Teasdale LLP

(57) ABSTRACT

A power system for a wind turbine having a measurement device configured to detect an overfrequency condition within an electrical system and a controller communicatively coupled to the measurement device. The controller is configured to switch the wind turbine between a power generation mode and a power consumption mode based on an existence of a detected overfrequency condition.

17 Claims, 4 Drawing Sheets

METHOD AND APPARATUS FOR CONTROLLING A WIND TURBINE

BACKGROUND OF THE INVENTION

The subject matter described herein relates generally to wind turbines and, more particularly, to a method and apparatus for controlling a wind turbine.

Generally, a wind turbine includes a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on a base that includes a truss or tubular tower.

Some wind turbine configurations include double-fed induction generators (DFIGs). Such configurations may also include power converters that are used to convert a frequency of generated electric power to a frequency substantially similar to a utility grid frequency. Moreover, such converters, in conjunction with the DFIG, also transmit electric power between the utility grid and the generator. A wound rotor of the DFIG also receives excitation power from one of the connections to the utility grid.

Electric utility grids are often designed to operate at specified frequencies, or within specified frequency ranges. Certain events, such as an overproduction of power, may increase the utility grid frequency above a predefined frequency limit (also known as overfrequency conditions). If not corrected, such overfrequency conditions may cause damage to utility grid components and/or to loads that are coupled to the utility grid. At least some known power systems reduce a power output of one or more generators in response to overfrequency conditions. However, such reduction of power may be slow, and existing overproduction of power may persist while the generator reduces its power output.

BRIEF DESCRIPTION OF THE INVENTION

In one embodiment, a power system for a wind turbine is provided that includes a measurement device configured to detect an overfrequency condition within an electrical system and a controller communicatively coupled to the measurement device. The controller is configured to switch the wind turbine between a power generation mode and a power consumption mode based on an existence of a detected overfrequency condition.

In another embodiment, a wind turbine operatively coupled to an electrical system is provided that includes a generator configured to be coupled to the electrical system, a measurement device operatively coupled to the electrical system and configured to detect an overfrequency condition within the electrical system, and a controller communicatively coupled to the measurement device. The controller is configured to switch the wind turbine between a power generation mode and a power consumption mode based on an existence of a detected overfrequency condition.

In yet another embodiment, a method for controlling a wind turbine is provided that includes coupling a generator to the wind turbine and to an electrical system. An overfrequency condition is detected within the electrical system and the generator is switched between a power generation mode and a power consumption mode based on an existence of a detected overfrequency condition.

DETAILED DESCRIPTION OF THE INVENTION

The embodiments described herein use a measurement device to detect an overfrequency condition within an electrical system, such as an electrical utility grid. If an overfrequency condition is detected, a controller transmits one or more pitch commands to a pitch system that rotates one or more blades of a wind turbine to a predefined controlled position. The controller switches a generator from a power generation mode to a power consumption mode. The controller transmits one or more negative torque commands and/or one or more negative power commands to a power converter. The power converter generates a rotor current based on the torque commands and/or the power commands. The power converter transmits the rotor current to a generator rotor. Power from the electrical utility grid is also transmitted to and consumed by the generator. The rotor current induces a torque to a rotor shaft that is coupled to the wind turbine blades and the rotor shaft rotates the wind turbine blades. Power is consumed from the electrical utility grid in order to reduce or minimize the overfrequency condition.

Figure 1:
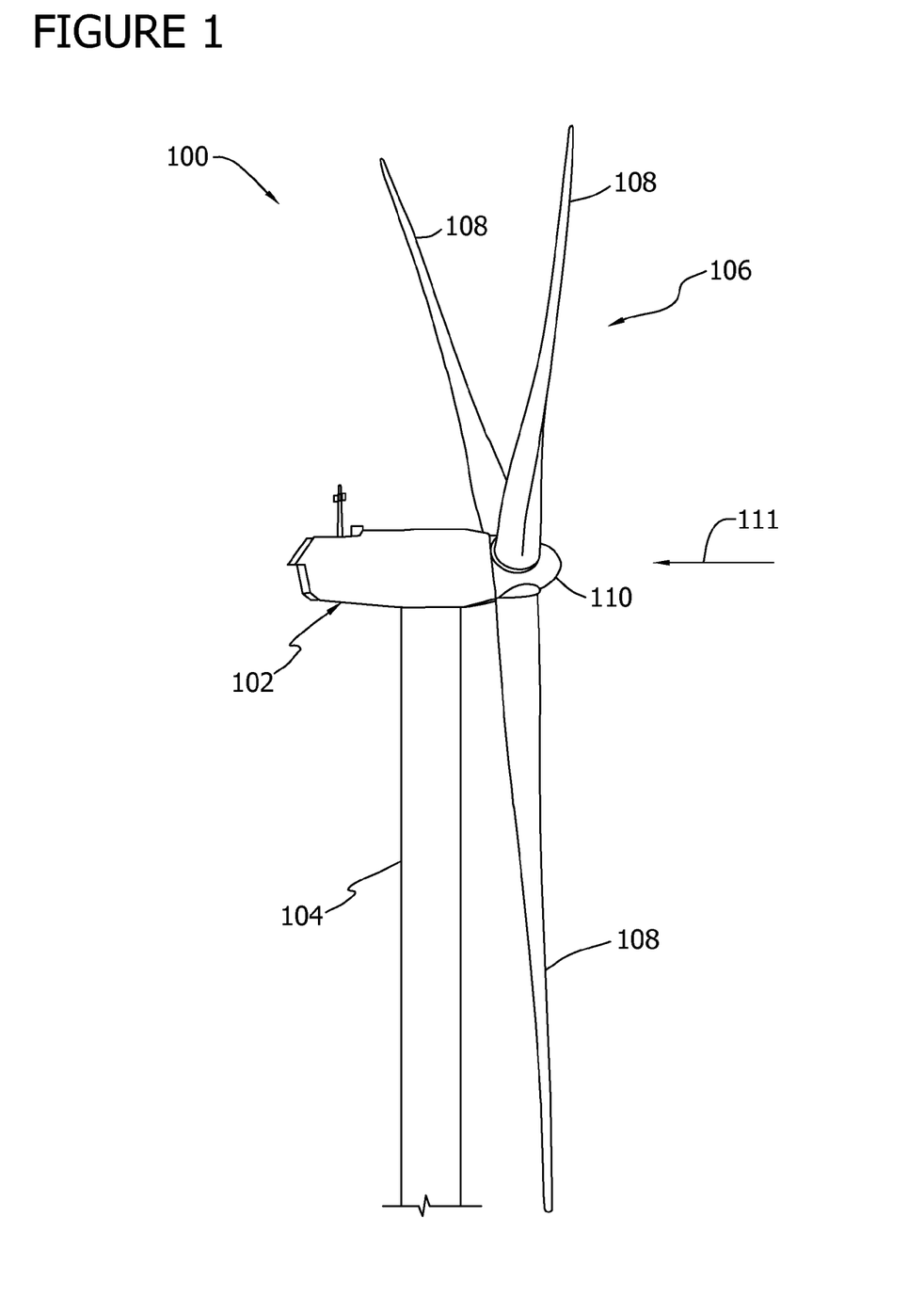
FIG. 1 is a perspective view of a portion of an exemplary wind turbine.

FIG. 1 is a perspective view of a portion of an exemplary wind turbine 100. Wind turbine 100 includes a nacelle 102 housing a generator (not shown in FIG. 1). Nacelle 102 is mounted on a tower 104 (a portion of tower 104 being shown in FIG. 1). Tower 104 may have any suitable height that facilitates operation of wind turbine 100 as described herein. Wind turbine 100 also includes a rotor 106 that includes three blades 108 attached to a rotating hub 110. Alternatively, wind turbine 100 includes any number of blades 108 that facilitates operation of wind turbine 100 as described herein. Blades 108 are spaced about hub 110 to facilitate rotating rotor 106, thereby transferring kinetic energy from wind 111 into usable mechanical energy, and subsequently, electrical energy. In the exemplary embodiment, wind turbine 100 includes a gearbox (not shown in FIG. 1) operatively coupled to rotor 106 and a generator (not shown in FIG. 1).

Figure 2:
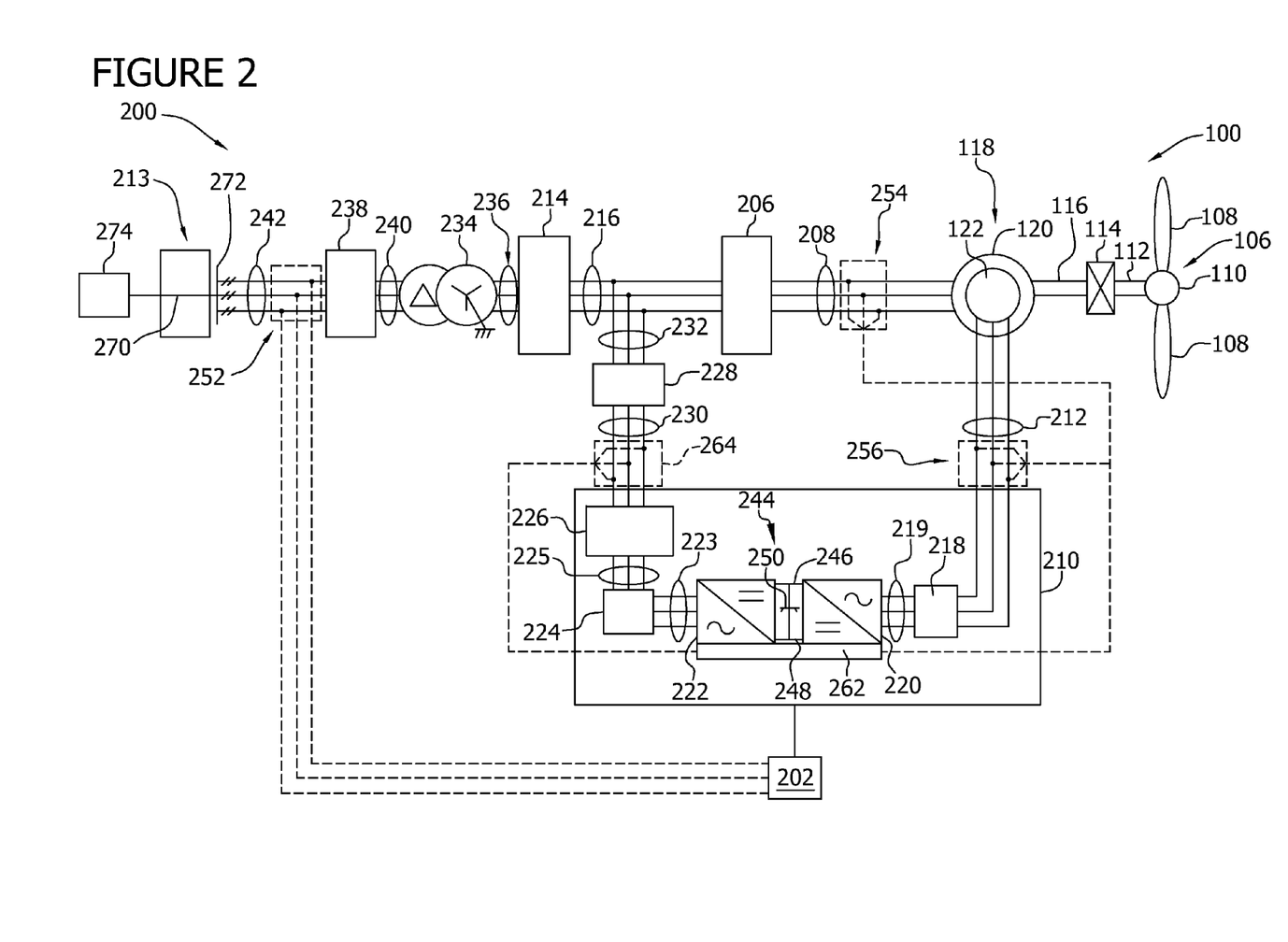
FIG. 2 is a schematic view of an exemplary electrical and control system suitable for use with the wind turbine shown in FIG. 1.

FIG. 2 is a schematic view of an exemplary electrical and control system 200 that may be used with wind turbine 100. Rotor 106 includes blades 108 coupled to hub 110. Rotor 106 also includes a low-speed shaft 112 rotatably coupled to hub 110. Low-speed shaft 112 is coupled to a step-up gearbox 114 that is configured to step up the rotational speed of low-speed shaft 112 and transfer that speed to a high-speed shaft 116. In the exemplary embodiment, gearbox 114 has a step-up ratio of approximately 70:1. For example, low-speed shaft 112 rotating at approximately 20 revolutions per minute (rpm) coupled to gearbox 114 with an approximately 70:1 step-up ratio generates a speed for high-speed shaft 116 of approximately 1400 rpm. Alternatively, gearbox 114 has any suitable step-up ratio that facilitates operation of wind turbine 100 as described herein. As a further alternative, wind turbine 100 includes a direct-drive generator that is rotatably coupled to rotor 106 without any intervening gearbox.

High-speed shaft 116 is rotatably coupled to generator 118. In the exemplary embodiment, generator 118 is a wound rotor, three-phase, double-fed induction (asynchronous) generator (DFIG) that includes a generator stator 120 magnetically coupled to a generator rotor 122. In an alternative embodiment, generator rotor 122 includes a plurality of permanent magnets in place of rotor windings.

Electrical and control system 200 includes a turbine controller 202. Turbine controller 202 includes at least one processor and a memory, at least one processor input channel, at least one processor output channel, and may include at least one computer (none shown in FIG. 2). As used herein, the term computer is not limited to integrated circuits referred to in the art as a computer, but broadly refers to a processor, a microcontroller, a microcomputer, a programmable logic controller (PLC), an application specific integrated circuit, and other programmable circuits (none shown in FIG. 2), and these terms are used interchangeably herein. In the exemplary embodiment, memory may include, but is not limited to, a computer-readable medium, such as a random access memory (RAM) (none shown in FIG. 2). Alternatively, one or more storage devices, such as a floppy disk, a compact disc read only memory (CD-ROM), a magneto-optical disk (MOD), and/or a digital versatile disc (DVD) (none shown in FIG. 2) may also be used. Also, in the exemplary embodiment, additional input channels (not shown in FIG. 2) include, without limitation, computer peripherals associated with an operator interface such as a mouse and a keyboard (neither shown in FIG. 2). Further, in the exemplary embodiment, additional output channels may include, without limitation, an operator interface monitor (not shown in FIG. 2).

Processors for turbine controller 202 process information transmitted from a plurality of electrical and electronic devices that may include, but are not limited to, voltage and current transducers. RAM and/or storage devices store and transfer information and instructions to be executed by the processor. RAM and/or storage devices can also be used to store and provide temporary variables, static (i.e., non-changing) information and instructions, or other intermediate information to the processors during execution of instructions by the processors. Instructions that are executed include, but are not limited to, resident conversion and/or comparator algorithms. The execution of sequences of instructions is not limited to any specific combination of hardware circuitry and software instructions.

Generator stator 120 is electrically coupled to a stator synchronizing switch 206 via a stator bus 208. In an exemplary embodiment, to facilitate the DFIG configuration, generator rotor 122 is electrically coupled to a bi-directional power conversion assembly 210 via a rotor bus 212. Alternatively, generator rotor 122 is electrically coupled to rotor bus 212 via any other device that facilitates operation of electrical and control system 200 as described herein. As a further alternative, electrical and control system 200 is configured as a full power conversion system (not shown) that includes a full power conversion assembly (not shown in FIG. 2) similar in design and operation to power conversion assembly 210 and electrically coupled to generator stator 120. The full power conversion assembly facilitates channeling electric power between generator stator 120 and an electric power transmission and distribution grid 213. In the exemplary embodiment, stator bus 208 transmits three-phase power from generator stator 120 to stator synchronizing switch 206. Rotor bus 212 transmits three-phase power from generator rotor 122 to power conversion assembly 210. In the exemplary embodiment, stator synchronizing switch 206 is electrically coupled to a main transformer circuit breaker 214 via a system bus 216. In an alternative embodiment, one or more fuses (not shown) are used instead of main transformer circuit breaker 214. In another embodiment, neither fuses nor main transformer circuit breaker 214 is used.

Power conversion assembly 210 includes a rotor filter 218 that is electrically coupled to generator rotor 122 via rotor bus 212. A rotor filter bus 219 electrically couples rotor filter 218 to a rotor-side power converter 220, and rotor-side power converter 220 is electrically coupled to a line-side power converter 222. Rotor-side power converter 220 and line-side power converter 222 are power converter bridges including power semiconductors (not shown). In the exemplary embodiment, rotor-side power converter 220 and line-side power converter 222 are configured in a three-phase, pulse width modulation (PWM) configuration including insulated gate bipolar transistor (IGBT) switching devices (not shown in FIG. 2) that operate as known in the art. Alternatively, rotor-side power converter 220 and line-side power converter 222 have any configuration using any switching devices that facilitate operation of electrical and control system 200 as described herein. Power conversion assembly 210 is coupled in electronic data communication with turbine controller 202 to control the operation of rotor-side power converter 220 and line-side power converter 222.

In the exemplary embodiment, a line-side power converter bus 223 electrically couples line-side power converter 222 to a line filter 224. Also, a line bus 225 electrically couples line filter 224 to a line contactor 226. Moreover, line contactor 226 is electrically coupled to a conversion circuit breaker 228 via a conversion circuit breaker bus 230. In addition, conversion circuit breaker 228 is electrically coupled to main transformer circuit breaker 214 via system bus 216 and a connection bus 232. Alternatively, line filter 224 is electrically coupled to system bus 216 directly via connection bus 232 and includes any suitable protection scheme (not shown) configured to account for removal of line contactor 226 and conversion circuit breaker 228 from electrical and control system 200. Main transformer circuit breaker 214 is electrically coupled to an electric power main transformer 234 via a generator-side bus 236. Main transformer 234 is electrically coupled to a grid circuit breaker 238 via a breaker-side bus 240. Grid circuit breaker 238 is connected to electric power transmission and distribution grid 213 via a grid bus 242. In an alternative embodiment, main transformer 234 is electrically coupled to one or more fuses (not shown), rather than to grid circuit breaker 238, via breaker-side bus 240. In another embodiment, neither fuses nor grid circuit breaker 238 is used, but rather main transformer 234 is coupled to electric power transmission and distribution grid 213 via breaker-side bus 240 and grid bus 242.

In the exemplary embodiment, rotor-side power converter 220 is coupled in electrical communication with line-side power converter 222 via a single direct current (DC) link 244. Alternatively, rotor-side power converter 220 and line-side power converter 222 are electrically coupled via individual and separate DC links (not shown in FIG. 2). DC link 244 includes a positive rail 246, a negative rail 248, and at least one capacitor 250 coupled between positive rail 246 and negative rail 248. Alternatively, capacitor 250 includes one or more capacitors configured in series or in parallel between positive rail 246 and negative rail 248.

Turbine controller 202 is configured to receive one or more voltage and electric current measurement signals from a first set of voltage and electric current sensors 252. Moreover, turbine controller 202 is configured to monitor and control at least some of the operational variables associated with wind turbine 100. In the exemplary embodiment, each of three voltage and electric current sensors 252 are electrically coupled to each one of the three phases of grid bus 242. Alternatively, voltage and electric current sensors 252 are electrically coupled to system bus 216. As a further alternative, voltage and electric current sensors 252 are electrically coupled to any portion of electrical and control system 200 that facilitates operation of electrical and control system 200 as described herein. As a still further alternative, turbine controller 202 is configured to receive any number of voltage and electric current measurement signals from any number of voltage and electric current sensors 252 including, but not limited to, one voltage and electric current measurement signal from one transducer.

As shown in FIG. 2, electrical and control system 200 also includes a converter controller 262 that is configured to receive one or more voltage and electric current measurement signals. For example, in one embodiment, converter controller 262 receives voltage and electric current measurement signals from a second set of voltage and electric current sensors 254 coupled in electronic data communication with stator bus 208. Converter controller 262 receives a third set of voltage and electric current measurement signals from a third set of voltage and electric current sensors 256 coupled in electronic data communication with rotor bus 212. Converter controller 262 also receives a fourth set of voltage and electric current measurement signals from a fourth set of voltage and electric current sensors 264 coupled in electronic data communication with conversion circuit breaker bus 230. Second set of voltage and electric current sensors 254 is substantially similar to first set of voltage and electric current sensors 252, and fourth set of voltage and electric current sensors 264 is substantially similar to third set of voltage and electric current sensors 256. Converter controller 262 is substantially similar to turbine controller 202 and is coupled in electronic data communication with turbine controller 202. Moreover, in the exemplary embodiment, converter controller 262 is physically integrated within power conversion assembly 210. Alternatively, converter controller 262 has any configuration that facilitates operation of electrical and control system 200 as described herein.

In the exemplary embodiment, electric power transmission and distribution grid 213 includes one or more transmission lines 270 (only one shown for clarity) that are coupled to grid bus 242 via a grid coupling 272. Electric power transmission and distribution grid 213 is operatively coupled to one or more loads 274 for providing power to loads 274.

During operation, wind 111 (shown in FIG. 1) impacts blades 108 and blades 108 transform wind energy into a mechanical rotational torque that rotatably drives low-speed shaft 112 via hub 110. Low-speed shaft 112 drives gearbox 114 that subsequently steps up the low rotational speed of low-speed shaft 112 to drive high-speed shaft 116 at an increased rotational speed. High speed shaft 116 rotatably drives generator rotor 122. A rotating magnetic field is induced by generator rotor 122 and a voltage is induced within generator stator 120 that is magnetically coupled to generator rotor 122. Generator 118 converts the rotational mechanical energy to a sinusoidal, three-phase alternating current (AC) electrical energy signal in generator stator 120. The associated electrical power is transmitted to main transformer 234 via stator bus 208, stator synchronizing switch 206, system bus 216, main transformer circuit breaker 214 and generator-side bus 236. Main transformer 234 steps up the voltage amplitude of the electrical power and the transformed electrical power is further transmitted to electric power transmission and distribution grid 213 via breaker-side bus 240, grid circuit breaker 238 and grid bus 242.

In the exemplary embodiment, a second electrical power transmission path is provided. Electrical, three-phase, sinusoidal, AC power is generated within generator rotor 122 and is transmitted to power conversion assembly 210 via rotor bus 212. Within power conversion assembly 210, the electrical power is transmitted to rotor filter 218 and the electrical power is modified for the rate of change of the output voltage associated with rotor-side power converter 220. Rotor-side power converter 220 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to line-side power converter 222 and line-side power converter 222 acts as an inverter configured to convert the DC electrical power from DC link 244 to three-phase, sinusoidal AC electrical power with pre-determined voltages, currents, and frequencies. This conversion is monitored and controlled via converter controller 262. The converted AC power is transmitted from line-side power converter 222 to system bus 216 via line-side power converter bus 223 and line bus 225, line contactor 226, conversion circuit breaker bus 230, conversion circuit breaker 228, and connection bus 232. Line filter 224 compensates or adjusts for harmonic currents in the electric power transmitted from line-side power converter 222. Stator synchronizing switch 206 is configured to close to facilitate connecting the three-phase power from generator stator 120 with the three-phase power from power conversion assembly 210.

Conversion circuit breaker 228, main transformer circuit breaker 214, and grid circuit breaker 238 are configured to disconnect corresponding buses, for example, when excessive current flow may damage the components of electrical and control system 200. Additional protection components are also provided including line contactor 226, which may be controlled to form a disconnect by opening a switch (not shown in FIG. 2) corresponding to each line of line bus 225.

Power conversion assembly 210 compensates or adjusts the frequency of the three-phase power from generator rotor 122 for changes, for example, in the wind speed at hub 110 and blades 108. Therefore, in this manner, mechanical and electrical rotor frequencies are decoupled from stator frequency.

Under some conditions, the bi-directional characteristics of power conversion assembly 210, and specifically, the bi-directional characteristics of rotor-side power converter 220 and line-side power converter 222, facilitate feeding back at least some of the generated electrical power into generator rotor 122. More specifically, electrical power is transmitted from system bus 216 to connection bus 232 and subsequently through conversion circuit breaker 228 and conversion circuit breaker bus 230 into power conversion assembly 210. Within power conversion assembly 210, the electrical power is transmitted through line contactor 226, line bus 225, and line-side power converter bus 223 into line-side power converter 222. Line-side power converter 222 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple sometimes associated with three-phase AC rectification.

The DC power is subsequently transmitted from DC link 244 to rotor-side power converter 220 and rotor-side power converter 220 acts as an inverter configured to convert the DC electrical power transmitted from DC link 244 to a three-phase, sinusoidal AC electrical power with pre-determined voltages, currents, and frequencies. This conversion is monitored and controlled via converter controller 262. The converted AC power is transmitted from rotor-side power converter 220 to rotor filter 218 via rotor filter bus 219 and is subsequently transmitted to generator rotor 122 via rotor bus 212, thereby facilitating sub-synchronous operation.

Power conversion assembly 210 is configured to receive control signals from turbine controller 202. The control signals are based on sensed conditions and/or operating characteristics of wind turbine 100 and electrical and control system 200. The control signals are received by turbine controller 202 and used to control operation of power conversion assembly 210. Feedback from one or more sensors may be used by electrical and control system 200 to control power conversion assembly 210 via converter controller 262 including, for example, conversion circuit breaker bus 230, stator bus and rotor bus voltages or current feedbacks via second set of voltage and electric current sensors 254, third set of voltage and electric current sensors 256, and fourth set of voltage and electric current sensors 264. Using this feedback information, and for example, switching control signals, stator synchronizing switch control signals and system circuit breaker control (trip) signals may be generated in any known manner. For example, for a grid voltage transient with predetermined characteristics, converter controller 262 will at least temporarily substantially suspend the IGBTs from conducting within line-side power converter 222. Such suspension of operation of line-side power converter 222 will substantially mitigate electric power being channeled through power conversion assembly 210 to approximately zero.

Figure 3:
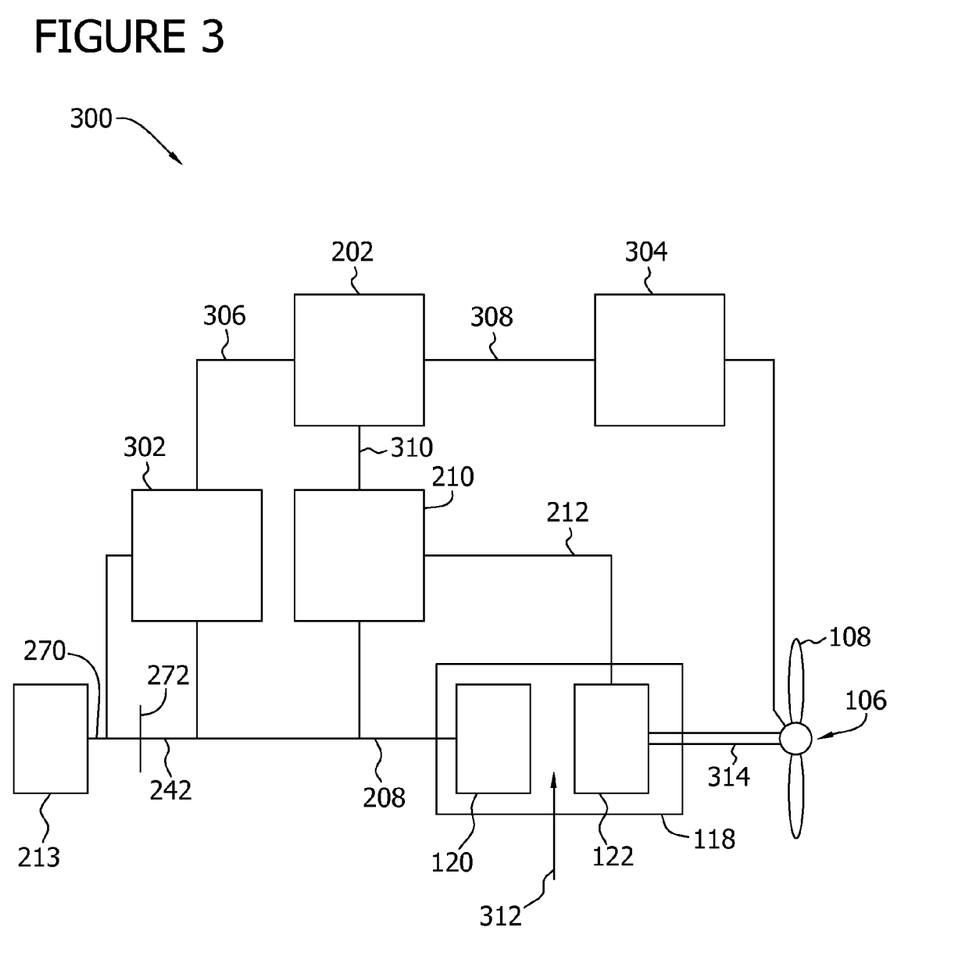
FIG. 3 is a block diagram of an exemplary power system suitable for use with the electrical and control system shown in FIG. 2.

FIG. 3 is a block diagram of an exemplary power system 300 suitable for use with electrical and control system 200 (shown in FIG. 2) and wind turbine 100 (shown in FIG. 1). Power system 300 is substantially similar to electrical and control system 200, and similar components are numbered with similar reference numerals. In the exemplary embodiment, power system 300 includes turbine controller 202 communicatively coupled to a measurement device 302, to power conversion assembly 210, and to a pitch system 304. Alternatively, any suitable controller or control system may be used instead of turbine controller 202. In the exemplary embodiment, power conversion assembly 210 is also operatively coupled to generator 118 that includes generator rotor 122 and generator stator 120.

In the exemplary embodiment, turbine controller 202 controls an operation of power system 300. Turbine controller 202 is communicatively coupled to measurement device 302 by a measurement bus 306. As used herein, the term "bus" includes a plurality of conductors, but may also include a single conductor or an interface by which two or more components may communicate wirelessly. Turbine controller 202 receives one or more measurements from measurement device 302 through measurement bus 306. Turbine controller 202 is communicatively coupled to pitch system 304 by a pitch control bus 308 and/or by one or more slip rings (not shown). Turbine controller 202 transmits one or more pitch commands through pitch control bus 308 to pitch system 304 to adjust a pitch position of one or more blades 108 of rotor 106. Moreover, turbine controller 202 is communicatively coupled to power conversion assembly 210 by a converter bus 310. In the exemplary embodiment, converter bus 310 is a controller area network (CAN) bus. Alternatively, converter bus 310 is a local area network (LAN) bus using an Ethernet bus protocol, or any suitable bus. Turbine controller 202 transmits one or more torque commands and/or one or more power commands to power conversion assembly 210 through converter bus 310.

Measurement device 302 measures one or more characteristics of electric power transmission and distribution grid 213. In the exemplary embodiment, measurement device 302 includes one or more current transformers electrically coupled to one or more transmission lines 270 and/or to grid bus 242. Measurement device 302 measures an amplitude, a frequency, and/or a phase angle of a voltage and/or a current of transmission line 270 and/or grid bus 242. In one embodiment, measurement device 302 includes first set of voltage and electric current sensors 252 (shown in FIG. 2). In the exemplary embodiment, measurement device 302 monitors the frequency of each phase of the current of transmission line 270 and/or grid bus 242 (hereinafter referred to as the "grid frequency") and detects if one or more phases of the grid frequency are above a predefined limit (hereinafter referred to as an "overfrequency condition"). During operation, the grid frequency has a baseline of about 50 Hertz (Hz), about 60 Hz, or any suitable frequency. In one embodiment, the predefined limit is between about 0% and about 10% above the baseline grid frequency. In another embodiment, the predefined limit is between about 1% and about 5% above the baseline grid frequency. In yet another embodiment, the predefined limit is about 3% above the baseline grid frequency. In the exemplary embodiment, the predefined limit is any suitable limit set by turbine controller 202 or by any suitable controller. Measurement device 302 transmits the measurements, including a notification of a detected overfrequency condition, to turbine controller 202. Alternatively, measurement device 302 transmits the measurements to turbine controller 202, and turbine controller 202 detects if an overfrequency condition occurs.

In the exemplary embodiment, power conversion assembly 210 includes rotor-side power converter 220, line-side power converter 222, and converter controller 262 (all shown in FIG. 2). Power conversion assembly 210 is a four quadrant power converter that can provide a driving current and a braking current to generator 118 to rotate and brake generator rotor 122 in a clockwise direction and a counterclockwise direction. Alternatively, power conversion assembly 210 includes any suitable configuration. In the exemplary embodiment, power conversion assembly 210 transmits a rotor current to generator rotor 122 through rotor bus 212. The rotor current includes a rotor flux component that produces a magnetic flux within generator 118 and a rotor torque component that produces a torque within generator 118. In the exemplary embodiment, power conversion assembly 210 controls a production of the rotor flux component and the rotor torque component such that a phase angle of the rotor flux component is substantially orthogonal to a phase angle of the rotor torque component. Stator bus 208 is coupled between power conversion assembly 210 and generator stator 120, and stator bus 208 is also coupled to grid bus 242, as shown in more detail in FIG. 2. Stator bus 208 carries a stator current that includes a stator flux component that produces a magnetic flux within generator stator 120 and a stator power component that produces power to electric power transmission and distribution grid 213. In one embodiment, power conversion assembly 210 reduces or minimizes a production of the stator flux component such that the stator flux component is substantially zero, and a power factor of generator stator 120 is substantially equal to one. Alternatively, power conversion assembly 210 produces a suitable stator flux component to create a desired magnetic flux within generator 118.

In the exemplary embodiment, pitch system 304 is at least partially housed within rotor 106 and is operatively coupled to at least one blade 108. Pitch system 304 rotates, or pitches, blades 108 to a desired position in response to one or more pitch commands transmitted by turbine controller 202. Pitch system 304 facilitates controlling a rotational speed of rotor 106 by adjusting an amount of torque induced to blades 108 by wind 111. If an overfrequency condition occurs, turbine controller 202 transmits one or more pitch commands that direct pitch system 304 to pitch blades 108 to a controlled position, such as a feathered position or any suitable position, to prevent rotor 106 from exceeding a rated speed (hereinafter referred to as an "overspeed condition").

In the exemplary embodiment, a flux gap 312 is defined between generator rotor 122 and generator stator 120. The rotor flux component flows through one or more windings (not shown) of generator rotor 122 and creates a rotating magnetic field that traverses flux gap 312. Torque produced by the rotor torque current interacts with the rotating magnetic field and, when combined with a rotation of a drive shaft 314, produces power within generator stator 120. In the exemplary embodiment, drive shaft 314 includes low-speed shaft 112 and/or high-speed shaft 116 (both shown in FIG. 2). The generated power is in the form of the stator power component of the stator current within the windings of generator stator 120, and the stator current is transmitted to electric power transmission and distribution grid 213. In a similar manner, the stator flux component may also flow through one or more windings (not shown) of generator stator 120 to create a rotating magnetic field across flux gap 312. The stator power component interacts with the rotating magnetic field and, when combined with the rotation of drive shaft 314, produces power within generator rotor 122. The generated power within generator rotor 122 is transmitted to electric power transmission and distribution grid 213 through power conversion assembly 210, stator bus 208, grid bus 242, and grid coupling 272.

During operation, in the exemplary embodiment, when no overfrequency condition is detected, power from electric power transmission and distribution grid 213 energizes the windings of generator stator 120 and/or the windings of generator rotor 122. Wind 111 impacts blades 108 and induces a rotation of blades 108 and rotor 106, causing a rotation of drive shaft 314. Turbine controller 202 calculates a desired power output of generator 118 and transmits one or more positive torque commands and/or one or more positive power commands to power conversion assembly 210 through converter bus 310 to produce the desired power. As described herein, the positive torque commands have a positive torque amplitude that represents a torque to be created within generator rotor 122. As described herein, the positive power commands have a positive power amplitude that represents a power to be generated within generator 118. Power conversion assembly 210 generates a suitable rotor current, including a rotor torque current component and a rotor flux current component, based on the torque commands and/or the power commands and transmits the rotor current to generator rotor 122. The rotational speed of drive shaft 314 is multiplied by the torque created by the rotor torque current component to generate power within generator 118. The power is transmitted to electric power transmission and distribution grid 213 as described above.

During operation, if an overfrequency condition is detected by measurement device 302 and/or turbine controller 202, turbine controller 202 prepares to switch wind turbine 100, and more specifically, generator 118 from a power generation mode to a power consumption mode. As used herein, the term "power generation mode" refers to a mode of operation in which generator 118 produces power to be used in an electrical system. As used herein, the term "power consumption mode" refers to a mode of operation in which generator 118 consumes power from the electrical system, rather than producing power to the electrical system. Turbine controller 202 transmits one or more pitch commands to pitch system 304 to pitch blades 108 to a controlled position. Pitch system 304 rotates blades 108 to the controlled position to reduce or minimize an amount of torque that wind 111 induces to blades 108. As such, a rotational speed of blades 108 is reduced. In one embodiment, blades 108 are pitched to a feathered position such that wind 111 induces substantially zero torque to blades 108, and the rotational speed of blades 108 gradually reduces to substantially zero revolutions per minute (rpm) due to frictional forces within rotor 106 and/or due to a braking effect of generator 118. Alternatively, a rotation of blades 108 is not reduced to substantially 0 rpm, and blades 108 continue to rotate while generator 118 is switched to the power consumption mode.

Once blades 108 are pitched to the controlled position, turbine controller 202 switches generator 118 from power generation mode to power consumption mode. In alternative embodiments, any suitable controller or control system, such as a wind farm controller or a wind farm control system (neither shown), switches generator 118 from power generation mode to power consumption mode. In the exemplary embodiment, turbine controller 202 switches generator 118 to power consumption mode by generating one or more negative torque commands and/or negative power commands. As described herein, a negative torque command has a negative torque amplitude that represents a torque to be created within generator rotor 122. As described herein, a negative power command has a negative power amplitude that represents a power to be generated within generator 118. Power conversion assembly 210 receives the negative torque commands and/or the negative power commands and outputs a resulting rotor current to generator rotor 122. In the exemplary embodiment, a phase angle of the rotor current is substantially inverted from a phase angle of the rotor current generated during the power generation mode of generator 118. More specifically, power conversion assembly 210 generates a rotor current having an inverted phase angle of the rotor flux component and an inverted phase angle of the rotor torque component with respect to the rotor current transmitted to generator rotor 122 during the power generation mode.

Due to the reduced or minimized rotational speed of blades 108 and the inverted rotor current, generator 118 substantially ceases producing power. Rather, generator 118 uses power from electric power transmission and distribution grid 213 to produce torque across flux gap 312. More specifically, the inverted phase angle of the rotor current substantially reverses a direction of current flow in generator 118. As such, current is drawn from electric power transmission and distribution grid 213 during the power consumption mode, rather than current being supplied to electric power transmission and distribution grid 213 during the power generation mode. Torque is generated in generator 118 due to the interaction of the rotor torque current and the magnetic flux within flux gap 312, in a substantially similar manner as described above. However, during the power consumption mode, the torque induces a rotation of drive shaft 314, rather than inducing a generation of power as described above in the power generation mode. The rotation of drive shaft 314 rotates rotor 106 and blades 108. It should be noted that blades 108 may rotate in the same direction during the power consumption mode as when generator 118 operates in the power generation mode. As such, power from electric power transmission and distribution grid 213 is consumed by generator 118 and/or power conversion assembly 210 and the power is used to drive the rotation of drive shaft 314.

If measurement device 302 and/or turbine controller 202 detects that the grid frequency is less than the predefined limit (i.e., an overfrequency condition is not occurring), turbine controller 202 switches generator 118 and/or wind turbine 100 from power consumption mode to power generation mode using a substantially similar, but reversed, procedure as described herein. As such, wind turbine 100 and/or turbine controller 202 switches generator 118 between power generation mode and power consumption mode based on an existence of a detected overfrequency condition.

Figure 4:
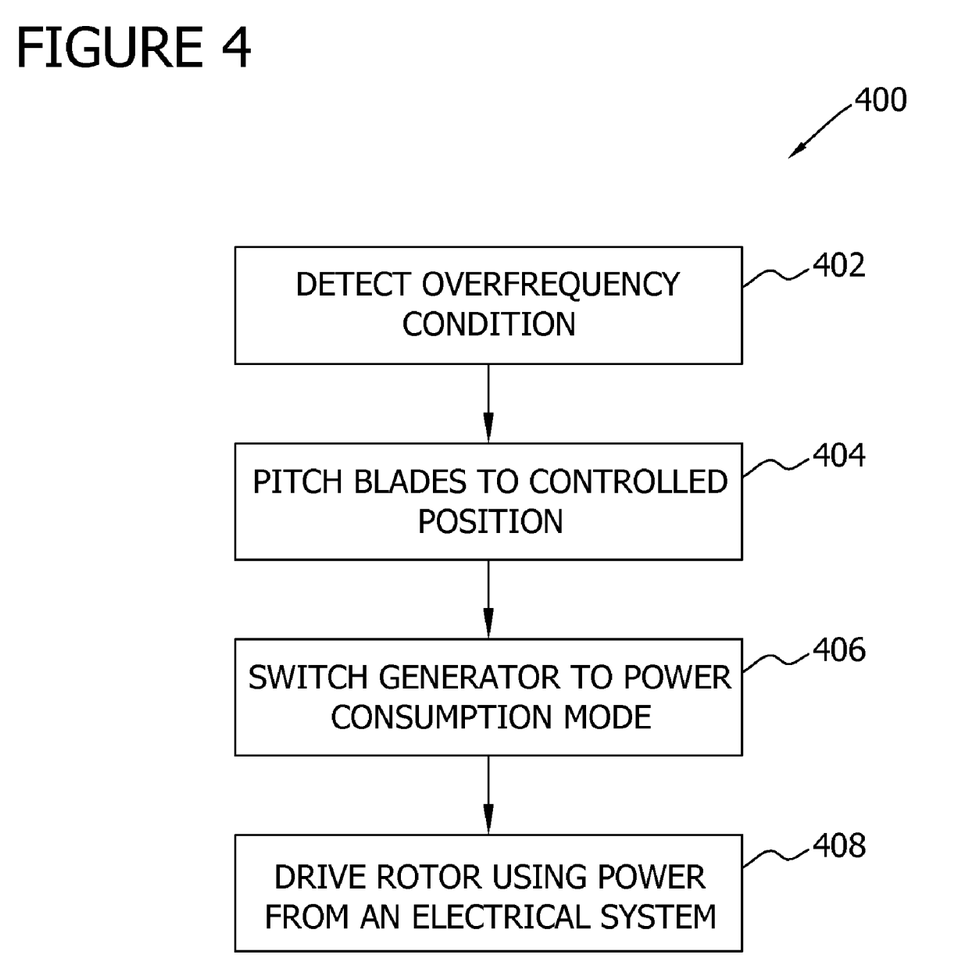
FIG. 4 is a flowchart of an exemplary method for controlling a wind turbine suitable for use with the power system shown in FIG. 3.

FIG. 4 is a flowchart showing an exemplary method 400 for controlling wind turbine 100 (shown in FIG. 1). In the exemplary embodiment, measurement device 302 (shown in FIG. 3) detects 402 an overfrequency condition within electric power transmission and distribution grid 213, electrical and control system 200 (both shown in FIG. 2), and/or power system 300 (shown in FIG. 3). Turbine controller 202 pitches 404 one or more blades 108 (both shown in FIG. 3) to a controlled position to prevent an overspeed condition of rotor 106 (shown in FIG. 3) and/or blades 108, as described above in reference to FIG. 3. After blades 108 are pitched 404 to the controlled position, turbine controller 202 switches 406 generator 118 (shown in FIG. 3) to a power consumption mode. In the exemplary embodiment, turbine controller 202 generates one or more negative torque commands and/or one or more negative power commands to switch 406 generator 118 to the power consumption mode. Once generator 118 is operating in the power consumption mode, generator 118 drives 408 rotor 106 using power supplied from an electrical system, such as electric power transmission and distribution grid 213, and/or any suitable electrical system. More specifically, generator 118 uses power from electric power transmission and distribution grid 213 to rotate drive shaft 314, which rotates rotor 106 and blades 108. As such, in the power consumption mode, generator 118 operates substantially as a motor by using power from electric power transmission and distribution grid 213 to rotate drive shaft 314, rotor 106, and blades 108.

A technical effect of the systems and method described herein includes at least one of: (a) coupling a generator to a wind turbine, and coupling the generator to an electrical system; (b) detecting an overfrequency condition within an electrical system; and (c) switching a generator from generating power to an electrical system to consuming power from the electrical system.

The above-described embodiments facilitate providing an efficient and cost-effective power system for a wind turbine. The power system detects overfrequency conditions within an electric utility grid. If an overfrequency condition is detected, the power system switches the wind turbine, or a generator within the wind turbine, from a power generation mode to a power consumption mode. The wind turbine consumes power during overfrequency conditions and facilitates reducing or minimizing electric utility grid overfrequencies. Moreover, the power system and wind turbine described herein may facilitate reducing overfrequency conditions more efficiently and more quickly than other known methods and systems. As such, the wind turbine described herein may be coupled to the electric utility grid while minimizing damage to the wind turbine and/or to one or more electric utility grid components that may result from otherwise uncorrected overfrequency conditions.

Exemplary embodiments of a wind turbine, power system, and methods for controlling a wind turbine are described above in detail. The methods, wind turbine, and power system are not limited to the specific embodiments described herein, but rather, components of the wind turbine, components of the power system, and/or steps of the methods may be utilized independently and separately from other components and/or steps described herein. For example, the power system and methods may also be used in combination with other wind turbine power systems and methods, and are not limited to practice with only the power system as described herein. Rather, the exemplary embodiment can be implemented and utilized in connection with many other wind turbine or power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power system for a wind turbine, said power system comprising:
   a measurement device configured to detect an overfrequency condition within an electrical system; and,
   a controller communicatively coupled to said measurement device, said controller configured to switch the wind turbine between a power generation mode and a power consumption mode based on an existence of a detected overfrequency condition, wherein said controller is further configured to:
   generate at least one of a negative torque command and a negative power command when the overfrequency condition is detected; and
   generate at least one of a positive torque command and a positive power command when the overfrequency condition is not detected.

2. A power system in accordance with claim 1, wherein said controller is further configured to switch the wind turbine from the power generation mode to the power consumption mode when the overfrequency condition is detected.

3. A power system in accordance with claim 1, further comprising at least one blade, said controller being further configured to pitch said blade to a predefined position when the overfrequency condition is detected.

4. A power system in accordance with claim 3, further comprising a generator communicatively coupled to said controller, said generator configured to use power from the electrical system to rotate said blade when the overfrequency condition is detected.

5. A power system in accordance with claim 4, further comprising a four quadrant power converter coupled to said generator, said four quadrant power converter configured to rotate said generator and to brake said generator in both a clockwise direction and a counterclockwise direction, respectively.

6. A power system in accordance with claim 1, wherein said measurement device comprises a current transformer coupled to the electrical system.

7. A wind turbine operatively coupled to an electrical system, said wind turbine comprising:
   at least one blade;
   a generator configured to be coupled to the electrical system;
   a measurement device operatively coupled to the electrical system and configured to detect an overfrequency condition within the electrical system; and,
   a controller communicatively coupled to said measurement device, said controller configured to switch said wind turbine between a power generation mode and a power consumption mode based on an existence of a detected overfrequency condition, wherein said generator is configured to consume power from the electrical system to rotate said blade when the overfrequency condition is detected.

8. A wind turbine in accordance with claim 7, wherein said controller is further configured to switch said wind turbine from the power generation mode to the power consumption mode when the overfrequency condition is detected.

9. A wind turbine in accordance with claim 7, wherein said controller is further configured to:
   generate at least one of a negative torque command and a negative power command when the overfrequency condition is detected; and,
   generate at least one of a positive torque command and a positive power command when the overfrequency condition is not detected.

10. A wind turbine in accordance with claim 7, said controller being further configured to pitch said blade to a predefined position when the overfrequency condition is detected.

11. A wind turbine in accordance with claim 7, further comprising a four quadrant power converter coupled to said generator, said four quadrant power converter configured to rotate said generator and to brake said generator in both a clockwise direction and a counterclockwise direction, respectively.

12. A wind turbine in accordance with claim 7, wherein said measurement device comprises a current transformer coupled to the electric system.

13. A method for controlling a wind turbine, said method comprising:
   coupling a generator to an electrical system;
   detecting an overfrequency condition within the electrical system;
   switching the generator between a power generation mode and a power consumption mode based on an existence of a detected overfrequency condition, wherein the generator is configured to consume power from the electrical system to rotate at least one blade when the overfrequency condition is detected.

14. A method in accordance with claim 13, further comprising configuring a controller to switch the wind turbine from the power generation mode to the power consumption mode when the overfrequency condition is detected.

15. A method in accordance with claim 14, further comprising configuring the controller to:
   generate at least one of a negative torque command and a negative power command when the overfrequency condition is detected; and,
   generate at least one of a positive torque command and a positive power command when the overfrequency condition is not detected.

16. A method in accordance with claim 13, said method further comprising pitching the blade to a predefined position when the overfrequency condition is detected.

17. A method in accordance with claim 13, further comprising:
   coupling a four quadrant power converter to the generator; and,
   configuring the four quadrant power converter to rotate the generator and to brake the generator in both a clockwise direction and a counterclockwise direction, respectively.

* * * * *